(12) United States Patent
Dawe et al.

(10) Patent No.: US 12,079,503 B2
(45) Date of Patent: Sep. 3, 2024

(54) METHOD AND SYSTEM FOR AUTOMATED ORCHESTRATION OF CONTAINER APPLICATION BACKUP FOR CONTAINER-BASED ECOSYSTEMS

(71) Applicant: Dell Products L.P., Round Rock, TX (US)

(72) Inventors: Trevor H. Dawe, Riverview (CA); Pooja Prasannakumar, Bangalore (IN); William J. Elliott, IV, Holden, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/072,136

(22) Filed: Nov. 30, 2022

(65) Prior Publication Data

US 2024/0176529 A1 May 30, 2024

(51) Int. Cl.
*G06F 3/06* (2006.01)
(52) U.S. Cl.
CPC ............ *G06F 3/065* (2013.01); *G06F 3/0665* (2013.01); *G06F 3/0689* (2013.01); *G06F 3/0604* (2013.01)

(58) Field of Classification Search
CPC ...... G06F 3/065; G06F 3/0665; G06F 3/0689; G06F 3/0604
See application file for complete search history.

(56) References Cited

U.S. PATENT DOCUMENTS

2021/0103499 A1* 4/2021 Alluboyina ............. G06F 3/067
2021/0328858 A1* 10/2021 Asveren ............. H04L 61/5007

* cited by examiner

*Primary Examiner* — Eric Cardwell
(74) *Attorney, Agent, or Firm* — Terrile, Cannatti & Chambers, LLP; Emmanuel A. Rivera

(57) ABSTRACT

Methods and a system that back up container-based applications running on an information handling system. Configurations are collected of the container-based applications. Volumes are determined as to the container-based applications as found in storage with persistent volumes. The container-based applications are quiesced, while clones of the volumes are created that are used by the container-based applications. A backup is performed using a data mover for each volume of the cloned volumes.

18 Claims, 4 Drawing Sheets

METHOD AND SYSTEM FOR AUTOMATED ORCHESTRATION OF CONTAINER APPLICATION BACKUP FOR CONTAINER-BASED ECOSYSTEMS

BACKGROUND OF THE INVENTION

Field of the Invention

The present invention relates to container-based applications running on information handling systems. More specifically, embodiments of the invention provide for the backing up of such container-based applications.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An emerging technology is container orchestration ecosystems employing container platforms, such as Kubernetes. Container orchestration ecosystems provide containers, where a container is a standard package of software, bundling application code along with configuration files and libraries. The use of container-based applications allows the ability to deploy applications seamlessly across various environments (e.g., information handling systems).

Such applications can be ephemeral or short-lived commodities with relatively low reliability rates. To address this shortcoming, container-based applications can be designed to conform to a stateless or server-less set of principles leading to a ubiquitous use of microservices. In order for a container-based application to be able to become available and lossless as to terms of state and data, the container-based application should frequently save data to persistent volumes that are made available across an ecosystem and persist as workloads are moved or nodes are rebooted of a container orchestration ecosystem.

Given the ephemeral nature of containers in container orchestration ecosystems, the frequent saving of state and data can be an additional burden that is placed on an information handling system running the container-based application(s) and its owner. Protecting data by a backup solution could become as unreliable as running the container-based application, especially if the container-based application is held in a quiesced state for an extended period of time. Furthermore, it is critical to reduce the time a container-based application is not available to accept new commands/transactions.

Furthermore, in the event of application crashes, taking snapshots of application with multiple volumes at different times does not support adequate application backup, since the time that snapshots are taken may not be immediately before the time a crash occurs.

SUMMARY OF THE INVENTION

A computer-implementable method, system and computer-readable storage medium for backing up container-based applications comprising collecting configurations of container-based applications running on an information handling system; determining volume of container-based applications, wherein the volume is accessed through a container platform from storage with persistent volumes; quiescing the container-based applications running on the information handling system; creating volume-based snapshots used by the container-based applications running on an information handling system; unquiescing the container-based applications running on the information handling system; creating clones of volumes used by the container-based applications running on the information handling system; and backing up using a specific data mover each volume from the cloned volumes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide for system and methods for which container-based applications, such as Kubernetes based applications, are backed up in an accelerated manner implementing volume group snapshots. Availability of the use of such container-based applications are provided while also providing offload backup operations which leverage container-based application consistency constructs, such as volume group snapshot capabilities that support instances when application crashes occur at an information handling system.

Implementations provide for a container orchestration ecosystem to make use of storage infrastructures, where a container platform, such as Kubernetes, writes to and reads from a storage infrastructure (e.g., storage array). To provide a full application backup in the container orchestration ecosystem, application-based backup operations are performed that save state information and flush transactions, and further save all state information as to runtime environment of the application at a container orchestration ecosystem level. Such information includes runtime containers, pod deployments, persistent volumes attached to pods, namespaces, etc. Therefore, full application backup capability can be realized with low application downtime.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
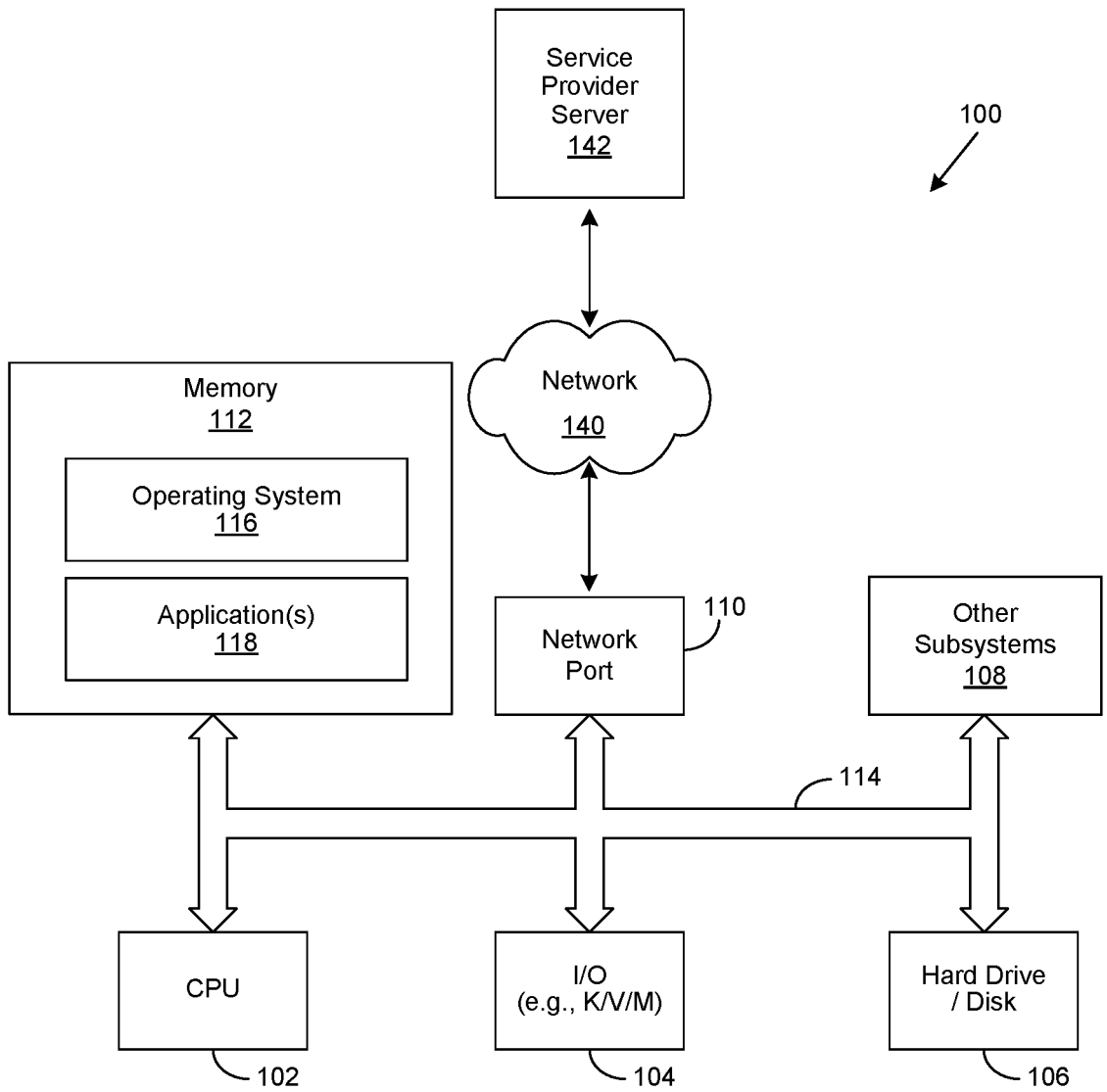
FIG. 1 is a general illustration of components of an information handling system as implemented in the present invention.

FIG. 1 is a generalized illustration of an information handling system (IHS) 100 that can be used to implement the system and method of the present invention. The information handing system (IHS) 100 can be a host to the peripheral devices described herein.

The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (IHS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116, and one or more application(s) 118.

Figure 2:
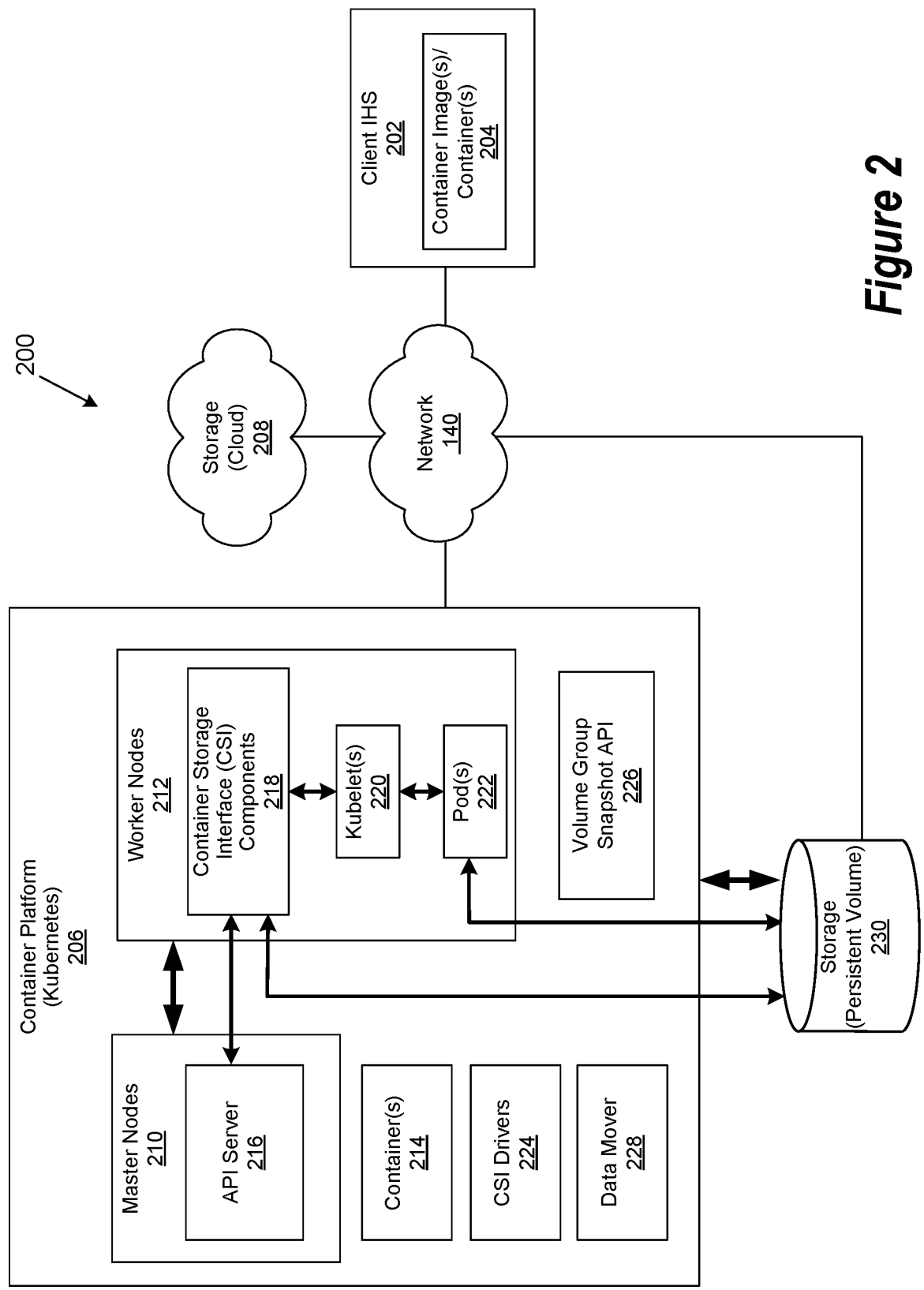
FIG. 2 illustrates a system as implemented in the present invention.

FIG. 2 illustrates a system 200 for backing up container-based applications. The system 200 represents a container orchestration ecosystem. One or more client information handling systems, presented as client IHS 202 is included in the system 200. The client IHS 202 can be embodied as an IHS 100 as described in FIG. 1. Various implementations provide for IHS 202 to include container image(s) or container(s) 204, which are provided from a container platform 206 as further described herein. A container image is a lightweight, standalone, executable package of software that includes what is used to run an application (i.e., container application), such as code, runtime, system tools, system libraries, and settings. Container images are used to instantiate containers at application runtime. The container image(s) or container(s) 204 are designed to be standardized to be portable and secure, and lightweight to allow the ability to use or share an operating system of the client IHS 202

Client IHS 202 is connected to network 140, where network 140 as described in FIG. 1, includes one or more wired and wireless networks, including the Internet. System 200 further includes storage (cloud) 208, which network 140 connects with client IHS 202 and container platform 206.

The system 200 includes container platform 206, such as Kubernetes. The container platform 206 can be implemented as one or more information handling systems 100, such as server computers, as described in FIG. 1. Implementations further provide for the container platform 206 to embodied as a cloud computing system.

The container platform 206 includes components such as master nodes 210 and worker nodes 212, which connect with one another. The master nodes 210 manage the worker nodes 212.

When container platform 206 (e.g., Kubernetes) is deployed, a cluster is provided. The cluster includes a set of nodes (i.e., "machines"), such as master nodes 210 and worker nodes 212 that run containerized applications. Each cluster includes at least one node (e.g., as master nodes 210 and worker nodes 212).

The container platform 206 includes and provides container(s) 214. In particular, container(s) 214 are sent to client IHS 202 and are stored as container image(s)/container(s) 204.

Implementations provide for the master nodes 210 to include an application program interface (API) server 216. For example, in Kubernetes, the API server 216 validates and configures data for the application program interface (API) objects such as pods, services, replication controllers, etc. Implementations provide for the API server 216 to service REST operations and provide a frontend to a cluster's shared state through which all other components interact.

Implementations provide for the use of container storage interface or CSI. CSI is used to expose arbitrary block and file storage systems to containerized workloads on container platform 206 (e.g., Kubernetes). With CSI, container platform 206 volume layers are extensible, allowing the ability to deploy plugins that expose storage systems without having to modify core code of the container platform 206. More options for storage can be provided, as well as more security and reliability of the container platform 206.

Implementations provide for worker nodes 212 to include container storage interface (CSI) components 218. API server 216 connects with CSI components 218. Examples of CSI components 218 include CSI sidecar containers, CSI objects, CSI driver testing tools, etc.

Furthermore, implementations, such as when container platform 206 is Kubernetes based, provide for worker nodes 212 to include kubelet(s) 220, and pod(s) 222. The kubelet(s) 220 connect the CSI components 218 to the pods 222. Kubelet(s) 220 maintain a life cycle of a container 214 and management of volume (e.g., CSI). Kubelet(s) 220 run on worker nodes 212 and provide for CSI service calls which mount and unmount storage volume from a storage system allowing pod(s) 222 to use such volumes.

The container platform 206 (e.g., Kubernetes) allows the ability to build scalable distributed applications by allocating work to different worker nodes 212 in a cluster. As discussed, container(s) 214 provide for a defined runtime that packages code, operating system, and runtime dependencies. Container(s) 214 provide for isolated units of work that can be run independently; however, to create complex applications, multiple containers 214 may be needed. For example, a web server container 214 may need a database to store long-term information, which would be a separate data base container that the web server container 214 depends on.

Pod(s) 222 indicate which container(s) 214 depend on which other container(s) 214 and interfaces for the container(s) 214 to communicate with. Pod(s) 222 can be considered as a unit of work that instructs how to deploy and run container(s) 214.

Implementations provide for the container platform 206 to include CSI driver(s) 224. Kubelet(s) 220 perform calls to the CSI driver(s) 224. The call can be performed through a shared on the container platform 206 via a HostPath volume. A CSI driver 224 can be registered to a kubelet 220. A CSI driver 224 can be deployed on a cluster.

In various implementations, the CSI driver(s) 224 are provided extended CSI specifications to allow volume group snapshots. In particular, in order to use a storage array's volume group snapshot capability, extensions are provided for CSI driver(s) 224 for application backup to achieve multi-volume consistency and to allow application availability. To leverage such extended CSI specifications, a volume group snapshot API 226 is provided.

Container(s) 214 are designed to be immutable (unchanging) entities having stateless characteristics, such that when a container 214 is shut, data created by the container is lost. In certain instances, it is desirable to preserve and share information. To provide for such, volumes are implemented. A volume is a directory containing data, that is accessed by container(s) 214 in a pod 222. The location of the directory, the storage media that supports the directory, and the directory's contents, depend on the specific type of volume being used.

Implementations provide for storing volumes in persistent storage, or the use of persistent volumes. Persistent volumes or PVs are storage resources designed to enable durable storage for containerized applications. Each PV is a persistent storage component within the container platform 206. A PV can be considered to belong to a cluster but exists independently of pods. To ensure statefulness, data represented by PVs continue to exist, even as changes occur to the cluster, regardless of deletion and recreation of pod(s) 222.

Implementations further provide for the container platform 206 to include a data mover 228. The data mover 228 is a plugin application responsible for transferring data between storage devices. The selected data mover depends on the specific use case for container application backup. Certain data movers are preferred depending on the environments including but not limited to the locations of the clusters and the types of storage arrays being used. The data mover 228 can be a separate application or native storage array functionality that provides an interface to support backing up and restoring of data. When homogenous storage arrays are being used, snapshot shipping is available as a data mover 228 due to performance of data transfer. When heterogenous storage arrays are being used or clusters are located both on-premises and in the cloud, "Restic" can be used as data mover 228 to back up files to object storage. When enabled on the storage arrays, "Glider" can be used as data mover 228 for native array support to move application data to an object store.

Implementations provide for the container platform 206 to connect with or include storage (persistent volume) 230. The storage 230 can be implemented as a storage array, where volume group snapshot API 226 interacts with storage (persistent volume) 230.

Figure 3:
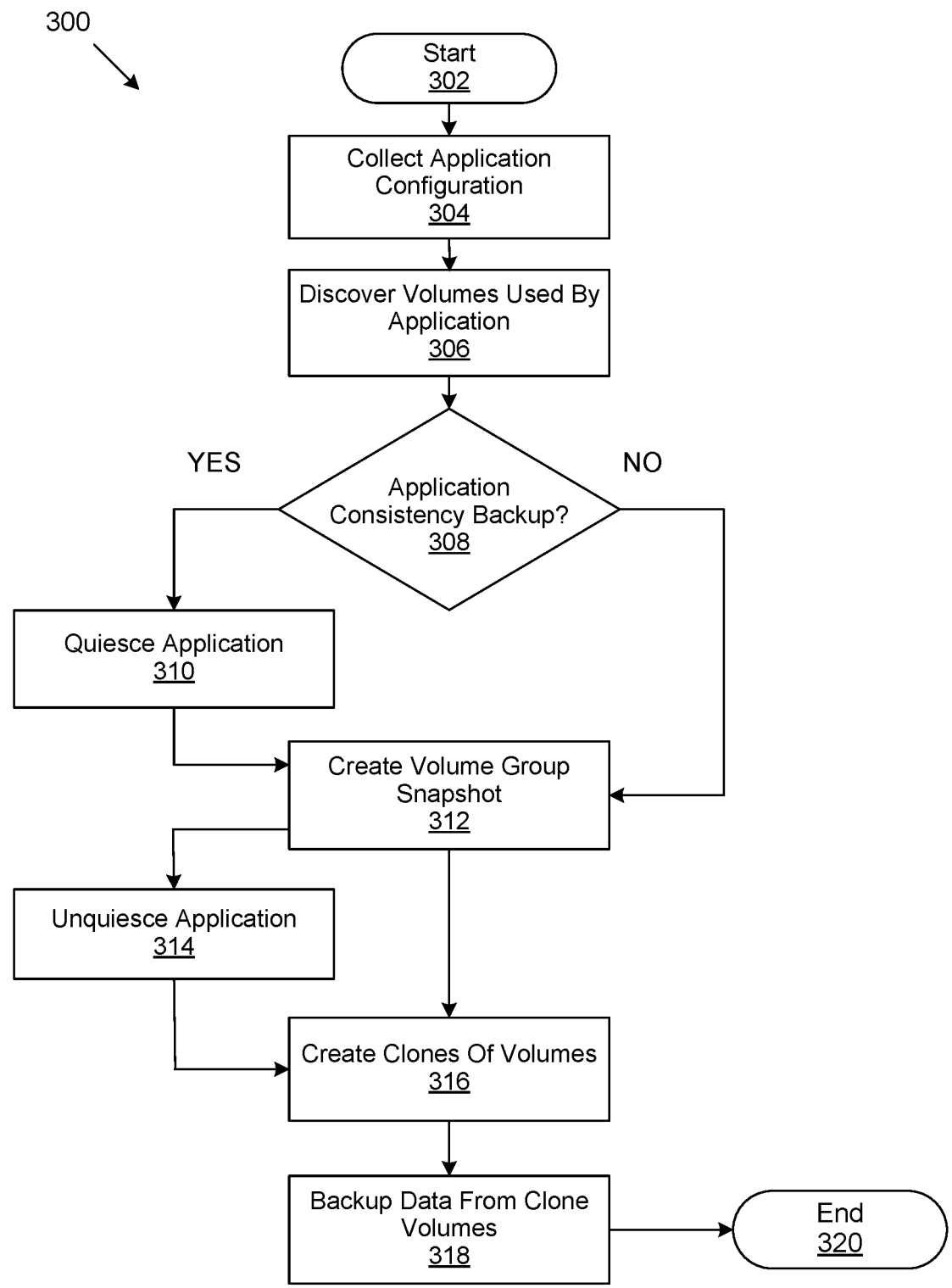
FIG. 3 is a generalized flowchart for providing use container-based applications and offload backup operations.

FIG. 3 shows a generalized flowchart for providing use container-based applications and offload backup operations. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention. For example, implementations provide for the described system 200 of FIG. 2, including the client IHS 202 and container platform 206 to perform the process 300 and the steps described herein.

At step 302, the process 300 starts. At step 304, application configurations are collected, including namespaces, pods (e.g., pods 222), deployments, claims to persistent volumes, and other resources which can be based on matching labels or by specifying namespaces.

At step 306, volumes are discovered that are used by container-based applications by querying application configurations. Pods (e.g., pods 222) for stateful applications are queried to determine the volumes that are written to.

At step 308, a determination is made if application consistency backup is performed. If so, following the YES branch of step 308, at step 310, the application is quiesced or stopped. Implementations provide for the use of an application specific script or command that pauses the application and writes any pending input/output operations to storage (e.g., local disk).

At step 312, a volume group snapshot is created of the volumes used by the application. Implementations, provide for CSI drivers (e.g., CSI drivers 224) with extended CSI specifications to be used to take volume group snapshots. Furthermore, implementations provide for the volume group snapshot API 226 to be leveraged for creating volume group snapshots. Such a CSI volume group snapshot API (e.g., volume group snapshot API 226) can interact with a storage array (e.g., storage 230) to create the volume group snapshot.

At step 314, unquiescing or thawing of the application is performed, allowing for the availability of the application to be used.

At step 316, clones of each volume are created using volume group or individual snapshots. Such clones provide copies of application data. For certain arrays in storage infrastructures (e.g., storage 230), cloning from individual snapshots are allowed that make up group snapshots, while certain other arrays allow cloning the group snapshot. In cases where arrays allow cloning of the individual snapshots, CSI API (e.g., volume group snapshot API 226) can be used to create a new volume from the group snapshot. In cases where arrays allow cloning from the group snapshot, an extension from CSI drivers (e.g., CSI drivers 224) can be used to create a new volume group form the volume group snapshot.

At step 318, backup is performed for each volume from the cloned volume using an appropriate data mover (e.g., data mover 228). A data mover for homogenous array to array snapshot shipping. A data mover for heterogeneous array to array snapshot shipping. "Glider", a native data mover, to move application data to a data store, such as storage (cloud) 204. For the data movers, crash consistency can be maintained by the workflow, since array (storage) and CSI driver supports volume group snapshots. Volume group snapshots is provided by expanding CSI specifications, by providing extensions in CSI drivers that allow the CSI drivers to leverage an underlying array's group snapshot capability.

At step 320, the process 300 ends. If application consistency backup is not to be performed, then following the NO branch of step 308, at step 312 a volume group snapshot is created of the volumes used by the application. At step 316, clones of each volume are created using volume group or individual snapshots. At step 318, backup is performed for each volume from the cloned volume using an appropriate data mover (e.g., data mover 228). At step 320, the process ends.

Figure 4:
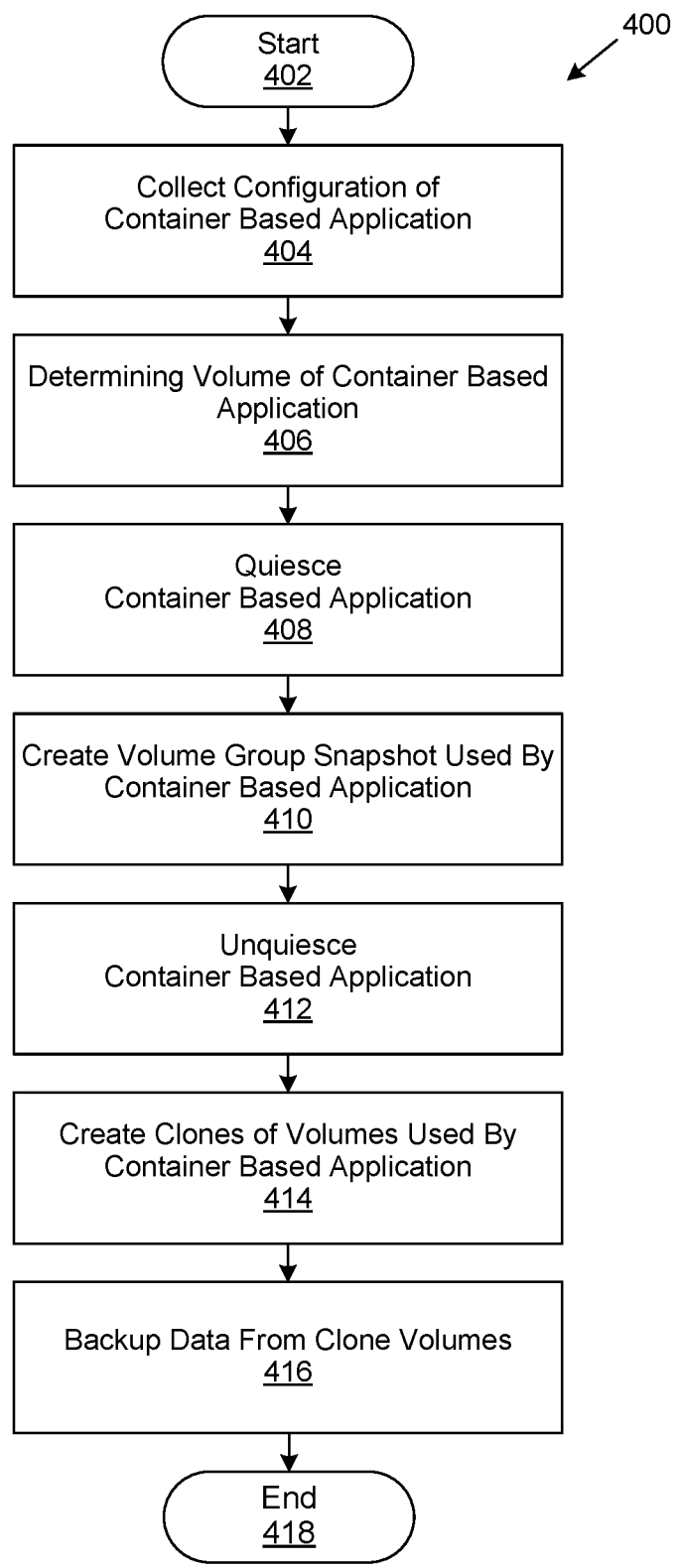
FIG. 4 is a generalized flowchart for backing up container-based applications.

FIG. 4 shows a generalized flowchart for backing up container-based applications. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, collection is performed s to the configuration of container-based application, such as applications provided in containers 214, and container images/containers 204.

At step 406, determination is performed as to the volume at a storage of the container-based application. In particular, a container platform is configured to write to and read from storage with persistent volume of container-based applications.

At step 408, quiescing is performed on the container-based application. An information handling system running the container-based application stops running the application.

At step 410, volume group snapshots are created that are used by the container-based application. Implementations, provide for CSI drivers (e.g., CSI drivers 224) with extended CSI specifications to be used to take volume group snapshots. Furthermore, implementations provide for the volume group snapshot API 226 to be leveraged for creating volume group snapshots. Such a CSI volume group snapshot API (e.g., volume group snapshot API 226) can interact with a storage array (e.g., storage 230) to create the volume group snapshot.

At step 412, unquiescing is performed on the container-based application. This "thawing" of the container-based application allows for the availability of container-based application.

At step 414, clones are created of the volumes used by the container-based applications. The clones provide copies of the data of the container-based application. For certain arrays in storage infrastructures (e.g., storage 230), cloning from individual snapshots are allowed that make up group snapshots, while certain other arrays allow cloning the group snapshot. In cases where arrays allow cloning of the individual snapshots, CSI API (e.g., volume group snapshot API 226) can be used to create a new volume from the group snapshot. In cases where arrays allow cloning from the group snapshot, an extension from CSI drivers (e.g., CSI drivers 224) can be used to create a new volume group from the volume group snapshot.

At step 416, backup of the data is performed for each volume from the cloned volume with a data mover. At step 418, the process 400 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for backing up container-based applications comprising:
   collecting configurations of container-based applications running on an information handling system;
   determining volume of container-based applications, wherein the volume is accessed through a container platform from storage with persistent volumes;
   quiescing the container-based applications running on the information handling system;
   creating volume-based snapshots by a container storage interface (CSI) that exposes arbitrary block and file storage of the storage with persistent volumes, used by the container-based applications running on an information handling system;
   quiescing the container-based applications running on the information handling system;
   creating clones of volumes used by the container-based applications running on the information handling system, wherein a first CSI API is used for cloning of individual snapshots from a group snapshot and a second CSI API is used for cloning of group snapshots from the group snapshot; and
   backing up using a specific data mover for each volume from the cloned volumes.

2. The computer-implementable method of claim 1, wherein the storage is a storage array that includes information as to runtime containers, pod deployments, persistent volumes attached to pods, and namespaces.

3. The computer-implementable method of claim 1, wherein the creating volume-based snapshots is performed using container storage interface (CSI) drivers with extended specifications used to take volume group snapshots.

4. The computer-implementable method of claim 3, wherein a CSI volume group snapshot application program interface (API) is used to interact with the storage with persistent volumes.

5. The computer-implementable method of claim 1, wherein the creating clones is from individual snapshots that make up a group.

6. The computer-implementable method of claim 1, wherein the data mover includes a homogenous array data mover, or a heterogeneous array data mover.

7. A system comprising:
   a plurality of processing systems communicably coupled through a network, wherein the processing systems include non-transitory, computer-readable storage medium embodying computer program code interacting with a plurality of computer operations for backing up container-based applications comprising:
      collecting configurations of container-based applications running on an information handling system;
      determining volume of container-based applications, wherein the volume is accessed through a container platform from storage with persistent volumes;
      quiescing the container-based applications running on the information handling system;
      creating volume-based snapshots by a container storage interface (CSI) that exposes arbitrary block and file storage of the storage with persistent volumes, used by the container-based applications running on an information handling system;
      quiescing the container-based applications running on the information handling system;
      creating clones of volumes used by the container-based applications running on the information handling system, wherein a first CSI API is used for cloning of individual snapshots from a group snapshot and a second CSI API is used for cloning of group snapshots from the group snapshot; and
      backing up using a specific data mover for each volume from the cloned volumes.

8. The system of claim 7, wherein the storage is a storage array that includes information as to runtime containers, pod deployments, persistent volumes attached to pods, and namespaces.

9. The system of claim 7, wherein the creating volume-based snapshots is performed using container storage interface (CSI) drivers with extended specifications used to take volume group snapshots.

10. The system of claim 9, wherein a CSI volume group snapshot application program interface (API) is used to interact with the storage with persistent volumes.

11. The system of claim 7, wherein the creating clones is from individual snapshots that make up a group.

12. The system of claim 7, wherein the data mover includes a homogenous array data mover, or a heterogeneous array data mover.

13. A non-transitory, computer-readable storage medium embodying computer program code for backing up container-based applications, the computer program code comprising computer executable instructions configured for:
   collecting configurations of container-based applications running on an information handling system;
   determining volume of container-based applications, wherein the volume is accessed through a container platform from storage with persistent volumes;

quiescing the container-based applications running on the information handling system;

creating volume-based snapshots by a container storage interface (CSI) that exposes arbitrary block and file storage of the storage with persistent volumes, used by the container-based applications running on an information handling system;

quiescing the container-based applications running on the information handling system;

creating clones of volumes used by the container-based applications running on the information handling system, wherein a first CSI API is used for cloning of individual snapshots from a group snapshot and a second CSI API is used for cloning of group snapshots from the group snapshot; and backing up using a specific data mover for each volume from the cloned volumes.

14. The non-transitory, computer-readable storage medium of claim 13, wherein the storage is a storage array that includes information as to runtime containers, pod deployments, persistent volumes attached to pods, and namespaces.

15. The non-transitory, computer-readable storage medium of claim 13, wherein the creating volume-based snapshots is performed using container storage interface (CSI) drivers with extended specifications used to take volume group snapshots.

16. The non-transitory, computer-readable storage medium of claim 15, wherein a CSI volume group snapshot application program interface (API) is used to interact with the storage with persistent volumes.

17. The non-transitory, computer-readable storage medium of claim 13, wherein the creating clones is from individual snapshots that make up a group or from a group snapshot.

18. The non-transitory, computer-readable storage medium of claim 13, wherein the data mover includes a homogenous array data mover, or a heterogeneous array data mover.

* * * * *